US008312398B2

(12) United States Patent
Majumder et al.

(10) Patent No.: US 8,312,398 B2
(45) Date of Patent: Nov. 13, 2012

(54) SYSTEMS AND METHODS FOR LITHOGRAPHY-AWARE FLOORPLANNING

(75) Inventors: Chayan Majumder, Delhi (IN); Pawan Fangaria, Uttar Pradesh (IN)

(73) Assignee: Cadence Design Systems, Inc., San Jose, CA (US)

( * ) Notice: Subject to any disclaimer, the term of this patent is extended or adjusted under 35 U.S.C. 154(b) by 346 days.

(21) Appl. No.: 12/424,330

(22) Filed: Apr. 15, 2009

(65) Prior Publication Data

US 2010/0269082 A1    Oct. 21, 2010

(51) Int. Cl.
*G06F 17/50*    (2006.01)
(52) U.S. Cl. ......... 716/102; 716/101; 716/118; 716/119
(58) Field of Classification Search .................... 716/102
See application file for complete search history.

(56) References Cited

U.S. PATENT DOCUMENTS 5,311,443 A * 5/1994 Crain et al. .................... 716/122
2006/0228041 A1 * 10/2006 Joshi .............................. 382/260

* cited by examiner

*Primary Examiner* — Stacy Whitmore
*Assistant Examiner* — Bryce Aisaka
(74) *Attorney, Agent, or Firm* — Kenyon & Kenyon LLP

(57) ABSTRACT

The present invention is directed towards designing integrated circuit and provides systems and methods for lithography-aware floorplanning. According to one embodiment of the invention, a method for circuit floorplanning is provided. The method comprises generating a floorplan through a floorplanner, performing a lithography-analysis within the floorplanner on at least a portion of the floorplan, and generating one or more violations that result from the lithography-analysis. Some embodiment, in addition to viewing a floorplan, further comprise of modifying the floorplan. Furthermore, some embodiments provide a method that further comprises fixing the violations that result from the lithography analysis.

42 Claims, 11 Drawing Sheets

EXAMPLE
CONTOUR
30

OPENS
(NECKING)
33

FLARING
36

SHORTS
(BRIDGING)
39

DEFOCUS
42

SYSTEMS AND METHODS FOR LITHOGRAPHY-AWARE FLOORPLANNING

FIELD OF THE INVENTION

The present invention relates to integrated circuits (ICs), and more particularly, some embodiments are directed toward tools used in the design of integrated circuits.

DESCRIPTION OF THE RELATED ART

Integrated circuits, or ICs, are generally created by patterning a plurality of devices and their interconnects onto a substrate such as a semiconductor wafer. This process generally starts with a design for the circuit or circuits that will make up the IC. A top-down design methodology is commonly employed using hardware description languages through which the designer creates an integrated circuit by hierarchically defining functional components of the circuit. Circuit designers usually utilize Electronic Design Automation ("EDA") tools to assist in the creation of integrated circuit, which reduce a circuit designer's effort in designing and editing the circuit. From this high-level functional description (e.g., circuit layout), a physical circuit implementation dataset is created, which is usually in the form of a netlist. This netlist identifies logic cell instances from a target standard cell library, and describes cell-to-cell connectivity.

A layout file is then created using the netlist. This is accomplished through a layout and routing process, which assigns logic cells to physical locations in the device layout and routes their interconnections. This layout can be transferred or applied to the semiconductor substrate in a series of layers that collectively form the devices that make up the components of the integrated circuit.

However, integrated circuit (IC) manufacturers (i.e,. fabrication plants) are limited in what size IC feature can be produced on a substrate (i.e., printed on to substrate) using photolithography. Due to known lithography effects suffered by circuit features at the sub-100 nm scale, when a sub-100 nm feature is printed onto a substrate (e.g., silicon wafer), it differs from the feature that was intended (i.e., the feature as drawn in the IC design during the design phase). FIG. 1 illustrates just such an occurrence with example contour 30. Specifically, design 31 is the feature as intended, while contour 32 is the feature once printed onto a substrate.

As a result, IC manufacturers provide specific rules and guidelines that features of an integrated circuit design must adhere to in order to ensure manufacturability of design once the manufacturers (i.e., a fabrication plant) receives it. These design rules, as they are collectively known, are actively imposed upon integrated circuit designs as they are created during the design phase. Through design rule checks (DRCs), an EDA tool can ensure that each IC design created meets a specific manufacturer's capabilities before the design is sent to that manufacturer.

Despite correctness of a design after DRC, a large percentage of chips fail per wafer because of defects in manufacturing processes and other related manufacturing aspects. Hence, in addition to DRC rules, manufacturers also provide design for manufacturability (DFM) rules, which increase the probability of a successful and defect-free integrated circuit being manufactured.

A further class of errors called lithography issues severely impact integrated circuit design and manufacturing. The lithography issues occur due to anomalies in the interaction of shapes within the optical proximity halo and non-linear systematic shape variations (e.g., necking 33, bridging 39, flaring 36, defocus 42, as seen in FIG. 1) at different process conditions. These lithographic effects and anomalies, especially the variations in shape, detract from an integrated circuit's overall yield. They are known to impact a circuit's timing, cause power leakage, and decrease signal integrity.

Accordingly, lithography issues such as those presented above are captured by EDA tools by modeling the shapes and the design topology based on proximity in order to predict if and when any of the aforementioned issues would occur for an integrated circuit during manufacture.

FIG. 2 is a flowchart illustrating an example of a conventional custom IC design flow 10. The flow 10 starts at the design of a schematic at stage 13, where the desired design of an integrated circuit is implemented as a schematic layout. In many instances, the schematic design is decomposed into multiple functional blocks, each block serving as a component of the integrated circuit design. During the floorplanning stage 16, a floorplanner defines what these functional blocks will be and how they will be brought together to form an integrated circuit from the design perspective. It also assists in defining pin, power stripe and blockage location. It is during the manual layout design 19 that the actual internals of each functional block is developed. Customarily, these functional blocks are developed on an individual basis. Each block is then validated under DRC and DFM rules before it is brought together with other functional blocks and components during the placement and routing stage 22. The placement and routing of functional blocks and other components forms the completed integrated circuit design and is performed in accordance with the floorplan as defined during stage 16.

During the physical verification stage 28, DRC, DFM rules, and lithography-versus-schematic (lithography-checks) verification are applied on the completed integrated circuit design. Through the verification stage 28, a top-level check can discover any lithographic or manufacturability issues that may exist in the IC design before it is sent to the manufacturer. Upon discovery of an issue, the floorplan can be modified during an additional floorplanning stage 16 such that the functional blocks and other components are rearranged to resolve the issues at hand.

In the alternative, some custom IC design flows perform the floorplanning stage 16 after the manual layout design of the individual blocks 19. In such instances, when a photolithography anomaly is discovered during the physical verification stage 28, the designer would resolve the issue by altering the internals within the functional blocks during an additional manual layout design stage 19.

Accordingly, floorplanning is an important step in custom IC design and serves as a foundation for physical implementation of an integrated circuit design. Through floorplanning, a designer can design and modify an integrated circuit at a hierarchical and macro level. By defining placement of functional blocks, I/Os, pins, and contacts pads, and other major components, a floorplanner can achieve a floorplan that is compact. In doing so, when functional blocks are placed adjacent to each other on the floorplan in close proximity, the photolithography effects and anomalies previously mentioned (e.g. interaction of shapes within the optical proximity halo and non-linear systematic shape variations) can be introduced into the overall integrated circuit design. This can occur even though the functional blocks or other components themselves are verified to be free of lithography issues. In other words, the lithography issues can exists within a floorplan despite the functional blocks being verified under DRC and DFM rules. These lithography issues within the floorplan exists due to design topologies in proximity of a shape.

BRIEF SUMMARY OF EMBODIMENTS OF THE INVENTION

According to one embodiment of the invention, a method for circuit floorplanning is provided. Such a method reports shape-level lithography errors at the instance-level and, more specifically, reports the errors within a floorplanner. For example, within some embodiments of the invention, a method is provided comprising performing shape level analysis on an integrated circuit; traversing the hierarchy of integrated circuit with any shape-level violations found during the analysis; identifying map points within the design at the instance-level; and then mapping the shape-level violations to those instance-level map points. Using these shape-level violations mapped to the instance-level, some methods then generate one or more instance-level guides based on those mappings. Some of these example methods further utilize the instance-level guides to automatically move around instance-level objects (e.g., circuit macro blocks) in an effort to resolve the shape-level violations.

Within the hierarchy of an integrated circuit design, the floorplan is the top level of the design and often referred to as the instance-level because it comprises instances of integrated circuit (IC) functional blocks. Functional blocks constitute a component of the integrated circuit that is designed to perform a specific function. In some integrated circuit designs, there can be one or more instances of a particular functional block within the same design. Each instance of a given functional block is identical to one another instance, apart from any customization to a particular instance.

With regard to the instance-level, it differs from the shape-level in that the shape-level comprises the actual shapes and wires that make the integrated circuit. The instance-level, on the other hand, can comprise both shape-level features and instances of the functional blocks. By detecting errors within functional blocks of an integrated circuit design, embodiments of the invention report such errors (e.g., shape-level errors found within the functional block) as instance-level errors within the floorplan. As a result, with the use of some embodiments, integrated circuit designers can avoid having to customize instantiations of a functional block in order to resolve lithographic errors caused by the arrangement of instances and shape-level features within a floorplan.

The method comprises generating a floorplan through a floorplanner, performing a lithography-analysis within the floorplanner on at least a portion of the floorplan, mapping one or more shape-level violations found within a hierarchy as one or more instance-level violations, and generating the one or more instance-level violations. The lithography analysis detects one or more shape-level violations within the floorplan. Additionally, some embodiments further comprise generating shape-level violations external to the hierarchy. Yet other embodiments, additionally comprise of modifying the floorplan.

In accordance with other embodiments, the method further comprises fixing the violations that result from the lithography analysis. Depending on the embodiment, fixing the violations can be either manual or automatic. Furthermore, depending on the embodiment, fixing the violation can be at an instance-level, shape-level, or both.

In further embodiments, the method further comprises configuring the lithography analysis before performing the lithography-analysis on the floorplan. The lithography analysis for some embodiments comprises generating a circuit layout used as input to the lithography analysis. The circuit layout for typical embodiments is in GDSII format. The circuit layout within other embodiments is compatible with Open Access Database format.

With regard to generating the violations, some embodiments comprise overlaying the one or more instance-level violations over the floorplan. Additionally, the one or more instance-level violations are displayed as error markers and hot spots.

In particular embodiments, the systems and methods as described above are implemented into a computer aided design tool, such as an EDA tool. In alternative embodiments, the systems and methods as described above are implemented as a computer program product.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

DETAILED DESCRIPTION OF THE EMBODIMENTS OF THE INVENTION

The present invention provides for systems and methods for lithography-aware floorplanning. Through certain embodiments of the invention, circuit design engineers (circuit designer) can be made aware of potential lithography-effects (litho-effects) while the engineer is viewing, creating, or editing a floorplan within a floorplanner.

Embodiments can be implemented to predict and provide litho-effects during the floorplanning stage, giving a circuit designer notice of manufacturing variations while the circuit floorplan is designed. This can effectively allow the designer to avoid lithography issues downstream in the design chain (e.g., placement, routing). As a result, custom IC design flows using embodiments of the invention can reduce the design cycle with fewer design iterations (e.g., does not require a DRC and litho clean circuit block to be modified in order to resolve lithographic-issues caused once the block is placed in the floorplan), avoid costly-re-spins, and reduce integrated circuit (IC) failures. In particular, various embodiments of the present invention provide improved floorplanning with respect to macro-placement and input/output (I/O) placement.

Embodiments of the present invention can be applied to known macro-placement techniques, such as abutment and limited-channeling. In abutment, the circuit design engineer abuts circuit blocks within the circuit floorplan such that a more compact circuit design results. In doing so, abutment typically leads to savings in routing resources, savings silicon space, and improved circuit timing. On the other hand, with respect to limited-channeling, circuit blocks are placed within a floorplan such that very thin channels are maintained between blocks for limited routing of critical nets.

Figure 1:
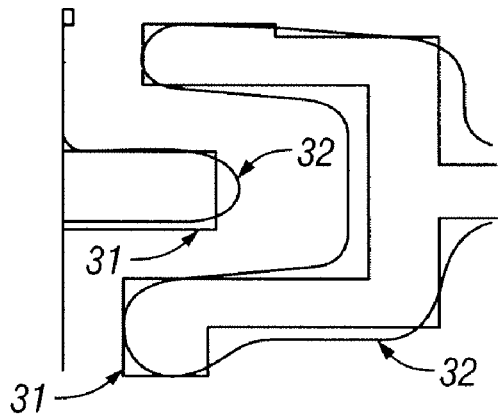
FIG. 1 is a set of depictions illustrating example photolithography anomalies known in the art.
Figure 1:
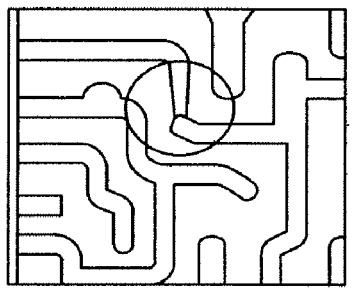
Figure 1:
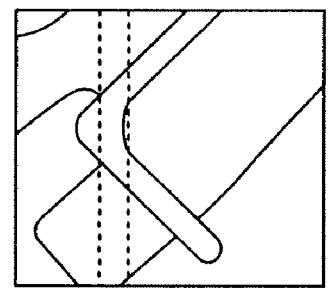
Figure 1:
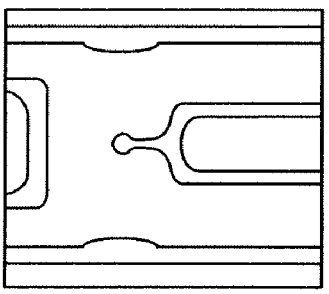
Figure 1:
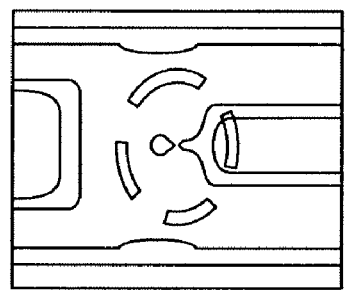
Figure 2:
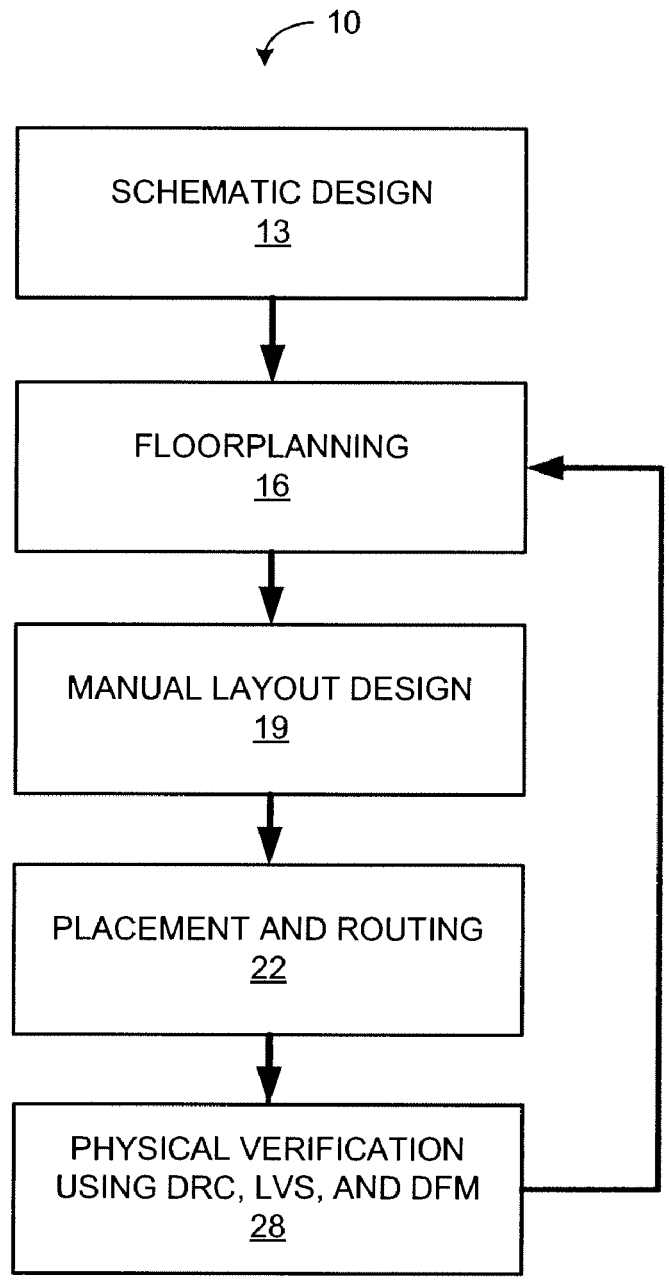
FIG. 2 is a flowchart illustrating an example a custom integrated circuit design as known in the art.
Figure 3:
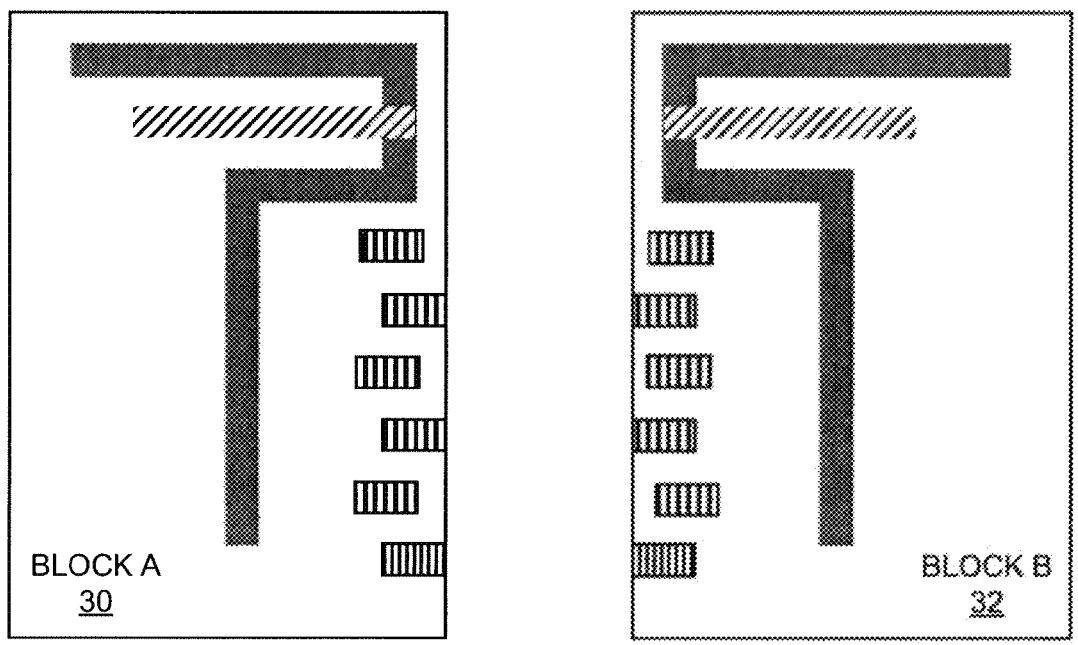
FIG. 3 is a diagram illustrating two example macro-blocks that can be placed within a floorplan.
Figure 4:
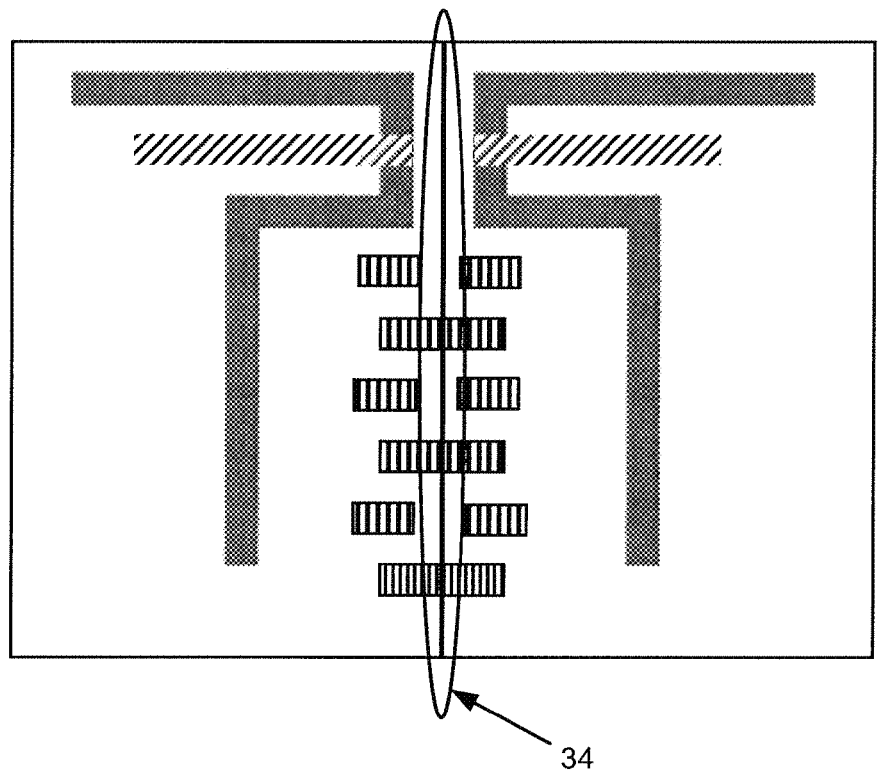
FIG. 4 is a diagram illustrating the two example macro-blocks of FIG. 3 abutted together.
Figure 5:
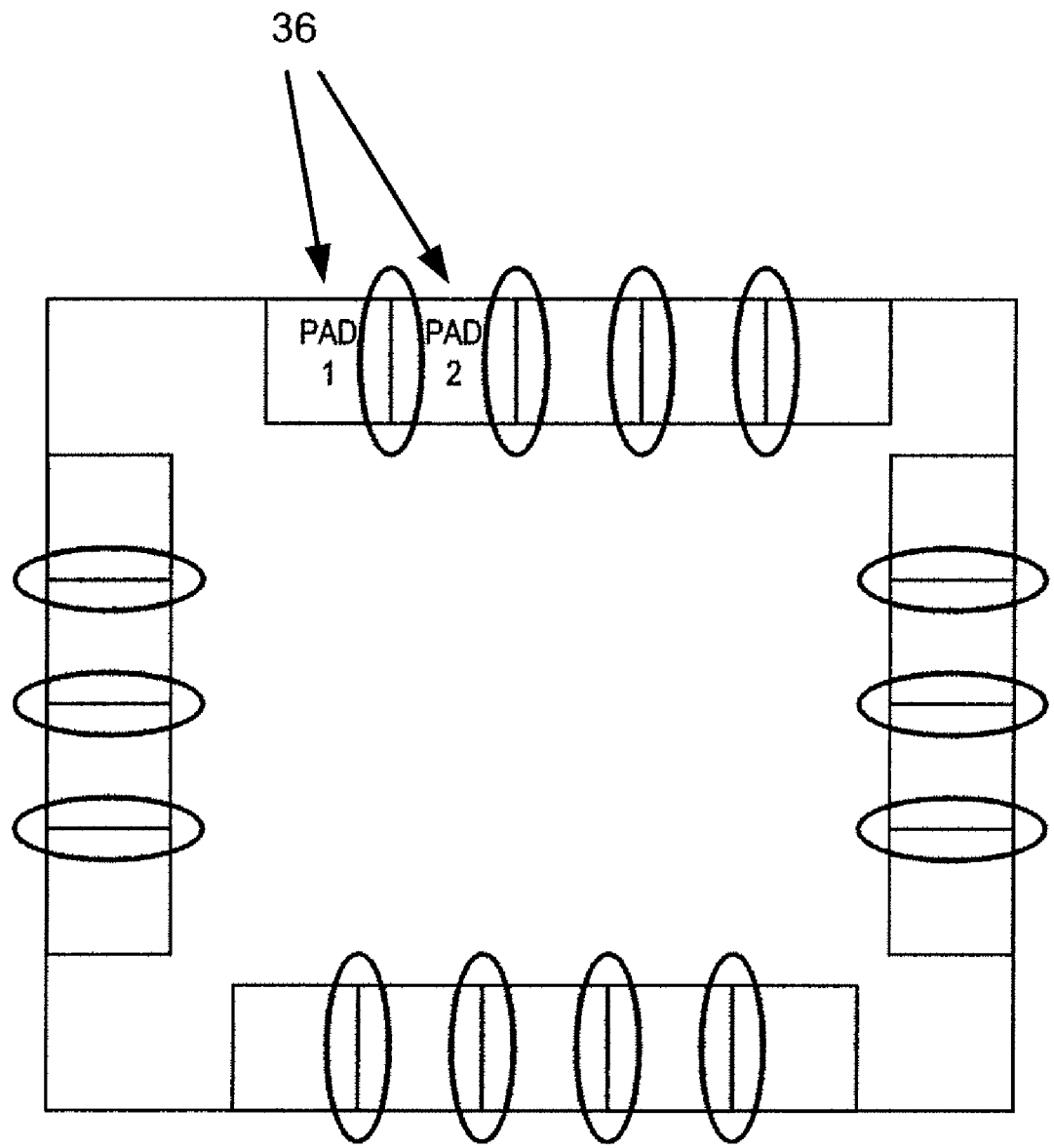
FIG. 5 is a diagram illustrating an example arrangement of input/output (I/O) pads that could potentially raise lithography issues.

FIG. 3 is a diagram illustrating two example macro-blocks, blocks 30 and 32, that can be abutted together using a floorplanner. FIG. 4 is a diagram illustrating the two example macro-blocks of FIG. 3 after abutment. Note, the designated area 34 represents the abutment area of blocks 30 and 32 where potential lithography-issues may arise. FIG. 5, on the other hand, provides a diagram illustrating an example arrangement of input/output (I/O) pads that could potentially raise lithography issues at 36.

Various embodiments of the present invention can be applied to macro-placement techniques (e.g., abutment, limited-channeling, etc.) to inform the circuit designer of hot spots created by lithography effects before the integrated circuit leaves the floorplanning stage. Accordingly, the invention can be configured to allow the circuit designer to fix the hot spots within the floorplan before the floorplan is finalized, leading to floorplans with improved or optimal abutment of circuit blocks that save on silicon space, and that allow for improved or optimal routing. Incidentally, with improved routing, the integrated circuit typically has less resistance and, thus, requires less power to operate.

With regard to I/O placement, I/O cells and pads are increasingly being squeezed onto circuit designs with I/O related components, such as electronic-static discharge (ESD) level shifters, regulators, signal buffers, utilizing more and more silicon space. When such I/O cells and pads are placed on the top level of a circuit floorplan, lithography-issues can arise from hot spots created by the top level routing connected to such I/O cells and pads. However, with application of various embodiments of the invention to I/O placement within floorplanning, proper attention can be paid to the lithography-issues caused by the I/O placement before leaving the floorplanning stage.

Note, embodiments of this invention can be implemented in both soft-intellectual property (soft-IP) environments, where an approximate-floorplan is created before the functional blocks have been created and then finalized after the creation of blocks, and hard-intellectual property (hard-IP) environments, where the final floorplan is initially created before the functional blocks have been created and then only slightly modified after the functional blocks have been created, if at all.

Figure 6:
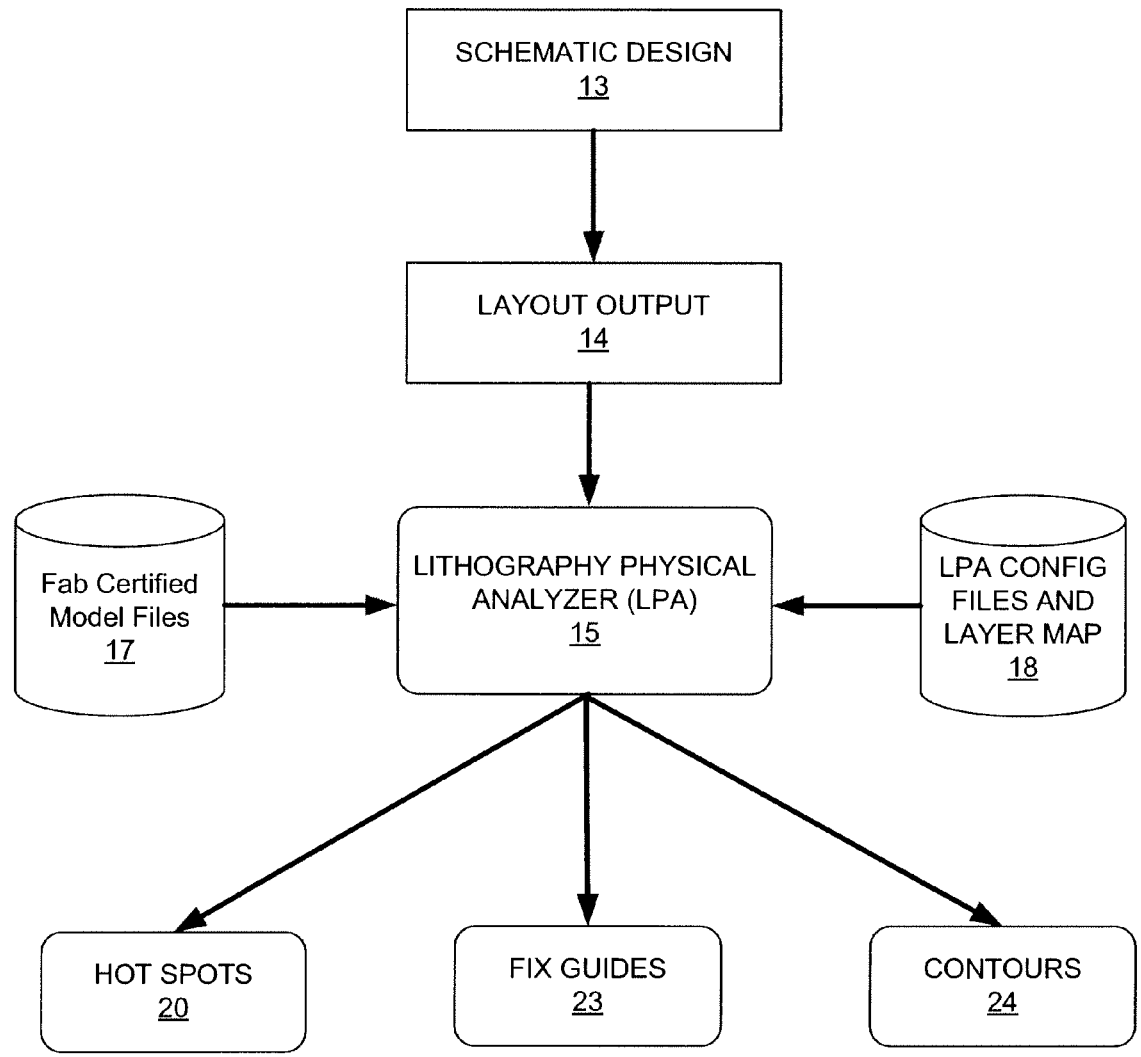
FIG. 6 is a flowchart illustrating an example lithography physical analyzer (LPA), which can be used in accordance with some embodiments of the invention, operating within an integrated circuit flow.

FIG. 6 is a flowchart illustrating an example lithography physical analyzer (LPA) 15 in accordance with some embodiments of the invention. FIG. 6 specifically illustrates operations of the lithography physical analyzer 15 within a conventional integrated circuit (IC) flow. However, in accordance with various embodiments of the invention, the illustrated lithography physical analyzer 15 and alternatives thereof facilitate lithography-physical analysis within a floorplanner. By using a lithography physical analyzer within a floorplanner, various embodiments of the invention not only enable a circuit designer to setup and run lithography-physical analysis against a floorplan within the floorplanner, but also view and fix errors detected by the lithography physical analyzer within the floorplanner.

Referring now FIG. 6, the lithography physical analyzer 15 is a model-based analyzer that predicts contour changes on silicon, identifies hot spots, and provides guidelines for reducing lithography effects. Hot spots are areas of a circuit layout that, although are printable, will result in known wafer-printing problems during circuit fabrication. In the illustrated IC flow, the process starts with the creation of a schematic design of an integrated circuit at operation 13, which results in the layout of the schematic being generated and outputted at operation 14. During the analysis layout output operation 14, the layout can be verified through a layout versus schematic operation (LVS), a design rule check (DRC), and a check for recommended rules for design for manufacturing (DFM) before being analyzed by the lithography physical analyzer (LPA) 15.

Then, the layout output (i.e. circuit layout) is inputted to the LPA 15 for lithographic verification against models known to be manufacturable by the target circuit fabrication plant. Typically, these models are stored in files referred to as fab-certified model files 17. In addition, before the LPA 15 begins its analysis of a circuit layout, it is configured using LPA configuration files and a layer map of the circuit layout 18. The LPA 15 determines the predicted-contours 24 of the circuit layout, as well as the hot spots 23 within the circuit layout. The LPA subsequently provides guidelines for fixing the circuit such that the hot spots can be resolved (i.e. fixing guides 23).

Figure 7:
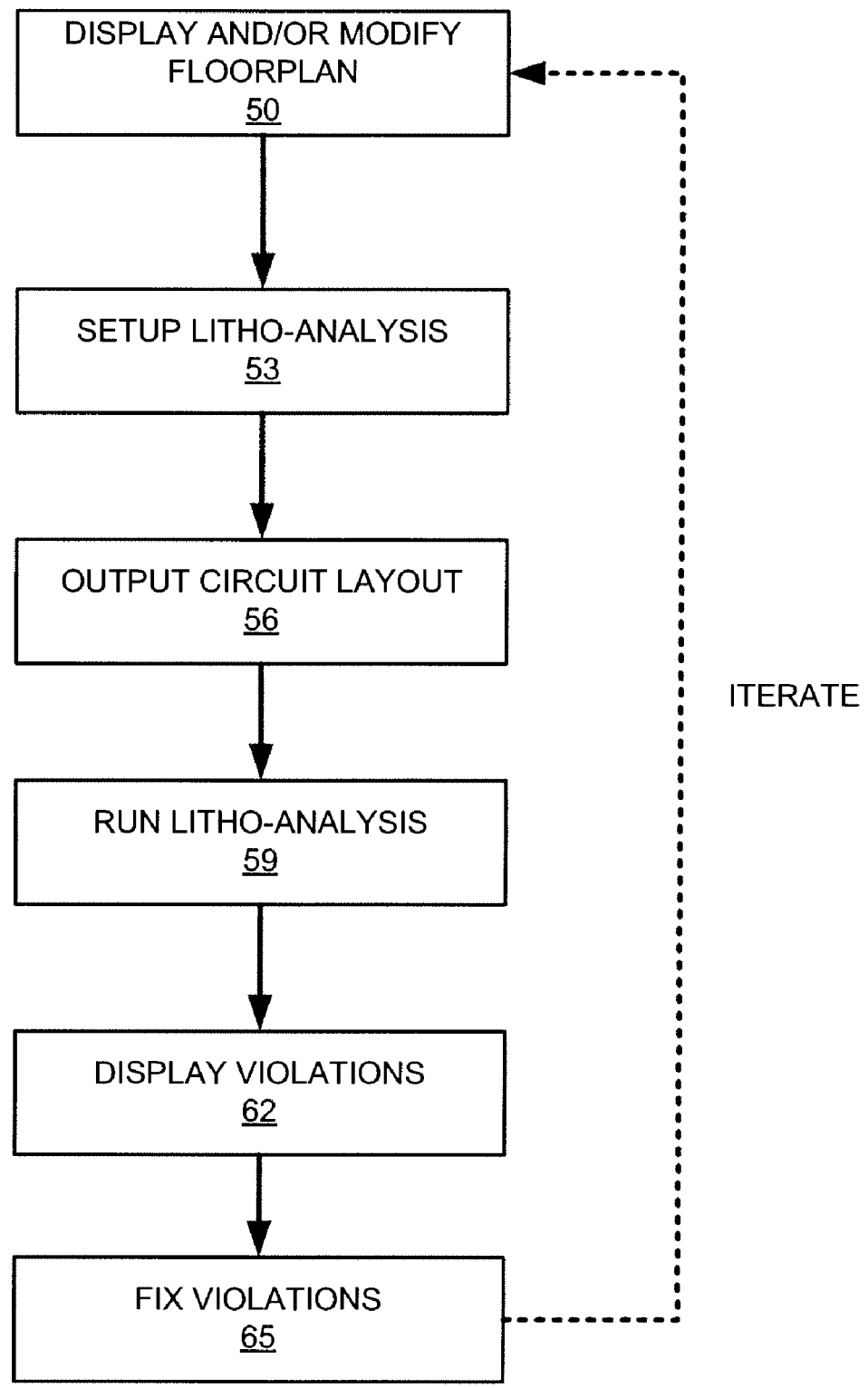
FIG. 7 is a flowchart illustrating an example method for lithography- aware floorplanning in accordance with some embodiments of the invention.

FIG. 7 is a flowchart illustrating an example method for lithography-aware floorplanning in accordance with some embodiments of the invention. According to some embodiments of the invention, this method is performed within the floorplanner component of an EDA tool. In yet further embodiments, a LPA similar or identical to the one described above is utilized within the method to facilitate lithography-physical analysis of the floorplan.

The method begins at operation 50 where a floorplan is displayed within a floorplanner for the circuit designer to either view or edit. Subsequently, the lithography-physical analysis is invoked against the floorplan, whether it is finished or unfinished. However, before the lithography-analysis is initiated, the litho-analysis is setup at operation 53.

Accordingly, at operation 53, the lithography-analysis is populated with setup information necessary for proper analysis for the floorplan. Although some embodiments complete the setup automatically, in other embodiments the circuit designer provides the setup information for the litho-analysis. The setup information includes information such as GDSII stream-out options (e.g., GDSII output file name, layer map file, DFII Technology file), LPA configuration options, and location of model files for litho-effects. Additional options include specifying the location of output files, such as the contours file, the log file for the LPA, fix guidelines .hif file (e.g., Hotspot Interface file), and the error marker file (e.g., .csm format file).

At operation 56, a circuit layout representing the floorplan is output for litho-analysis. In preferred embodiments, the circuit layout is outputted in GDSII format in accordance with the GDSII stream-out options set during operation 53. Subsequently, lithography-physical analysis of the outputted circuit layout (i.e. floorplan) begins operation 59. During operation, litho-analysis uses the parameters set during operation 53 to perform analysis. These parameters include the LPA configuration files as described above. Additionally, depending on the embodiment, the litho-analysis can be performed on the entire floorplan, on a defined area of the floorplan, or on a selected set within the floorplan.

Typically, a circuit designer will run litho-analysis on a defined area when the area of the design has undergone extensive changes and designer does not want to perform litho-analysis on the entire floorplan, which is both time consuming and processor intensive. For those embodiments that provide litho-analysis on a defined area, some of those embodiments facilitate the analysis by providing the coordinates of the defined area to the LPA.

With respect to performing litho-analysis on a selected set, the circuit designer may want to make point changes in the design to certain shapes and structures. The designer may also want to know the lithography impacts on those shapes such as, for example pins optimized for a soft block. In order to facilitate such specific analysis, some embodiments compute and supply the coordinates around the selected shapes to the LPA for analysis. The computed coordinates are typically sufficient to enclose the zone that contains that shape (e.g., 5-6 placement grids).

Figure 8:
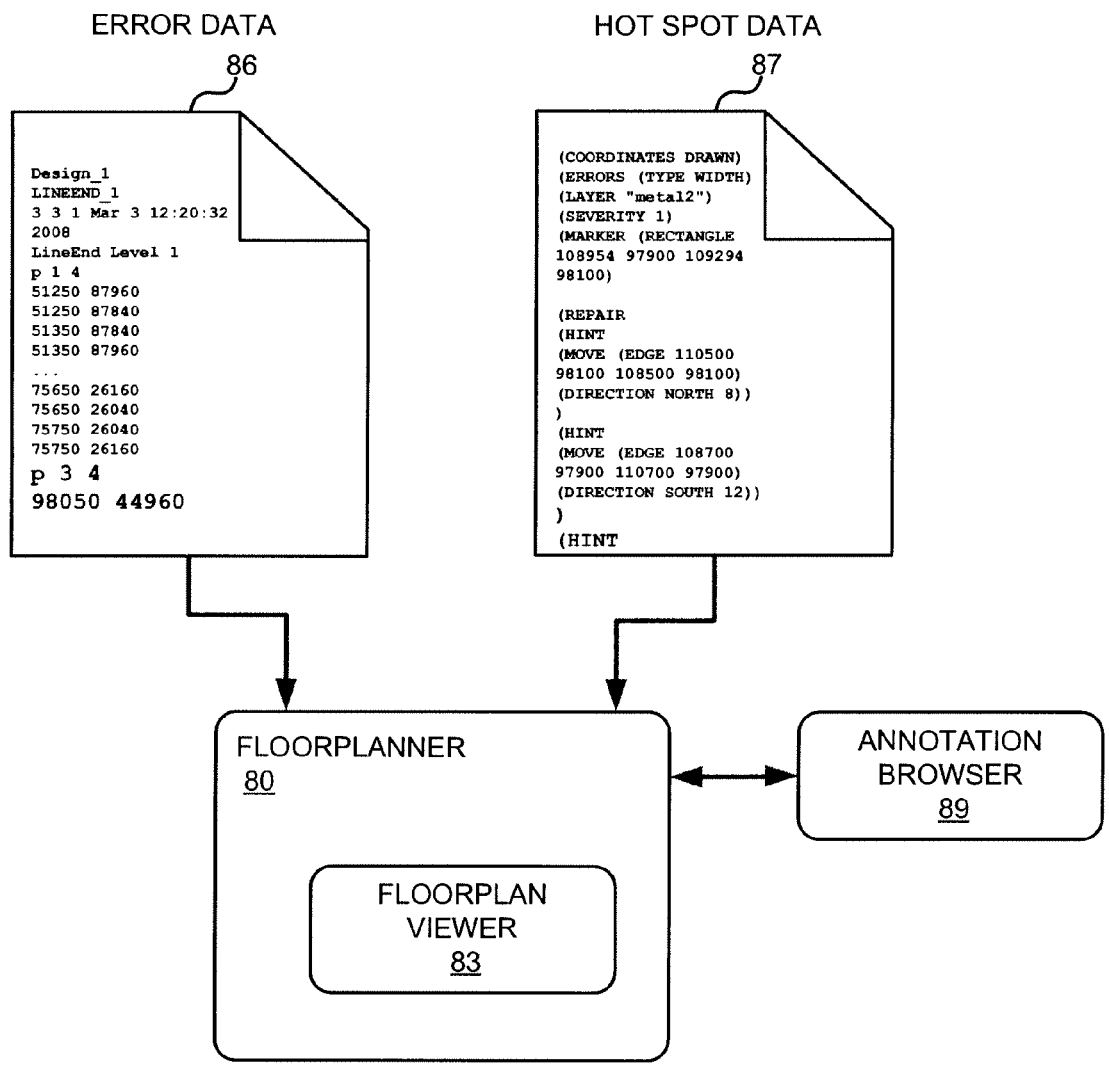
FIG. 8 is a diagram illustrating an example data-flow in accordance with one embodiment of the invention.

At the conclusion of the litho-analysis, the violations detected are displayed at operation 62. In some embodiments, the violations are provided within a log window as part of the floorplanner. In alternative embodiments, the violations discovered are populated into an annotation browser that reads and lists error markers and hot spot violations provided by the litho-analyzer (i.e. LPA). In such embodiments, the litho-analyzer generates error markers as a .csm file and the hot spots as a Hotspot Interface File (.hif). In addition to providing the hot spot errors found in the floorplan, the Hotspot Interface File supplies hints and guides to fix the hot spot error. In other embodiments, the violations are displayed directly over the floorplan. In further such embodiments, the hints and guides for fixing the floorplan are displayed along with the violations. The diagram provided in FIG. 8 illustrates how violations populated within error data 86 (e.g., error markers) and hot spot data 87 (e.g., Hotspot interface file) are read in by floorplanner 80 and then displayed either through the floorplan view 83 or through the annotation browser 89.

Following the display of lithography violations, at operation 65, the circuit designer may choose to fix the violations displayed at operation 62. Some embodiments of the invention provide two ways of repairing the violations displayed. The first method is for a circuit designer to view the violations on the floorplan and then manually fix the error. For the second method, the circuit designer invokes an automatic fix mode in which the floorplanner implements the fixes suggested within the hints and guidelines provided within the Hotspot interface file. Embodiments may also utilize a placement tool to automatically analyze the lithography errors detected and automatically move around instances of functional blocks to fix the detected errors. Placement tools can fix both instance level errors and shape-level errors.

Once the fixes have been implemented at operation 62, some embodiments of the invention iterates back to operation 50 to begin the method over again. Through multiple iterations of the method, the lithography-issues of the floorplan can be incrementally resolved.

Figure 9:
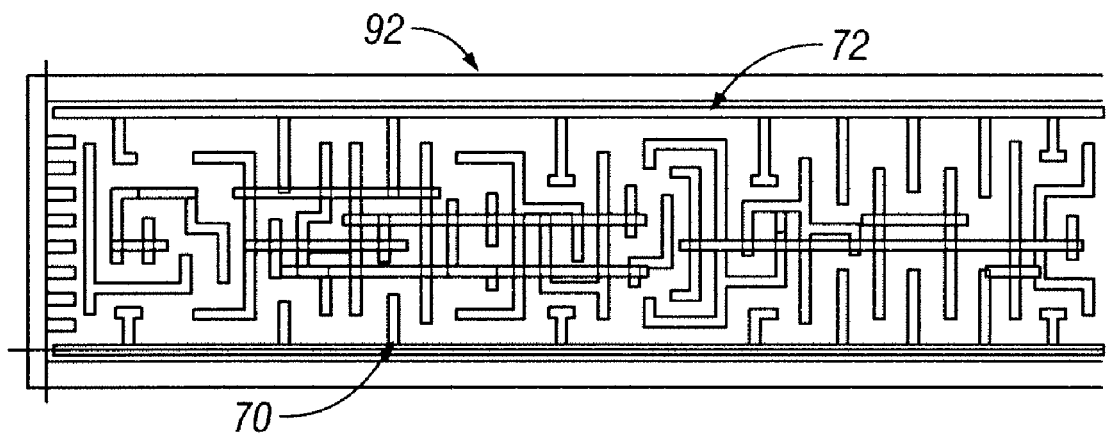
FIG. 9 is a diagram illustrating an example macro-block that is operable by a floorplanning method in accordance with one embodiment of the invention.
Figure 10:
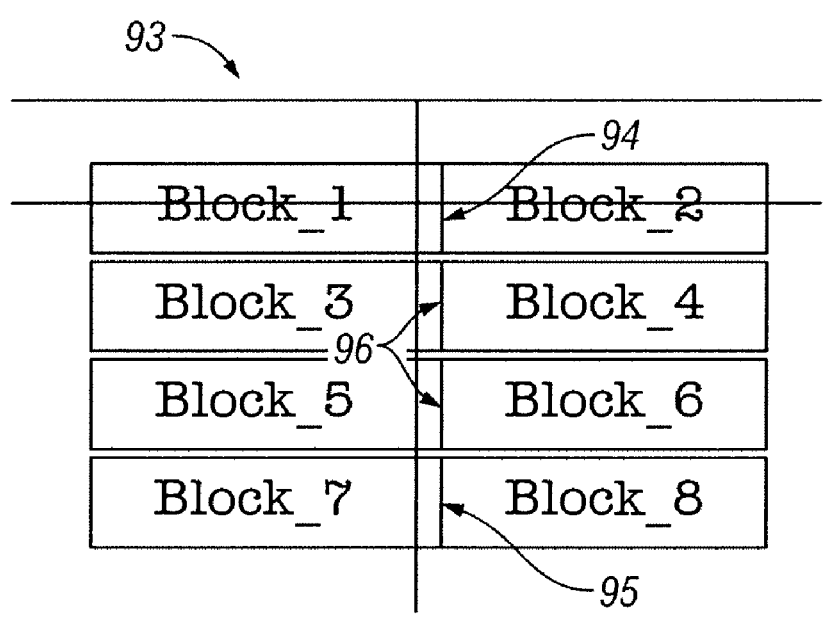
FIG. 10 is a diagram illustrating an example floorplan that is operable on by a floorplanning method in accordance with one embodiment of the invention.

FIGS. 9-13 are now described with respect to embodiments of the invention. Referring now to FIG. 9, a diagram is provided illustrating an example macro-block 92 that is operable by a floorplanner. This macro-block contains feature pattern M1 (70) and feature pattern M2 (72), also simply referred to as M1 and M2. FIG. 10 is a diagram illustrating an example floorplan 93 having eight spaces allocated for macro-block placement. As illustrated, block_1 and block_2 are abutted together at 94, while block_7 and block_8 are abutted together at 95. Block_3, block_4, block_5, and block_6 have a limited gap 96 between them to allow for critical signal outputs for top level routing. Note, before placement of macro-blocks into the allocated spaces, the floorplan 93 would not have lithography issues.

Figure 11:
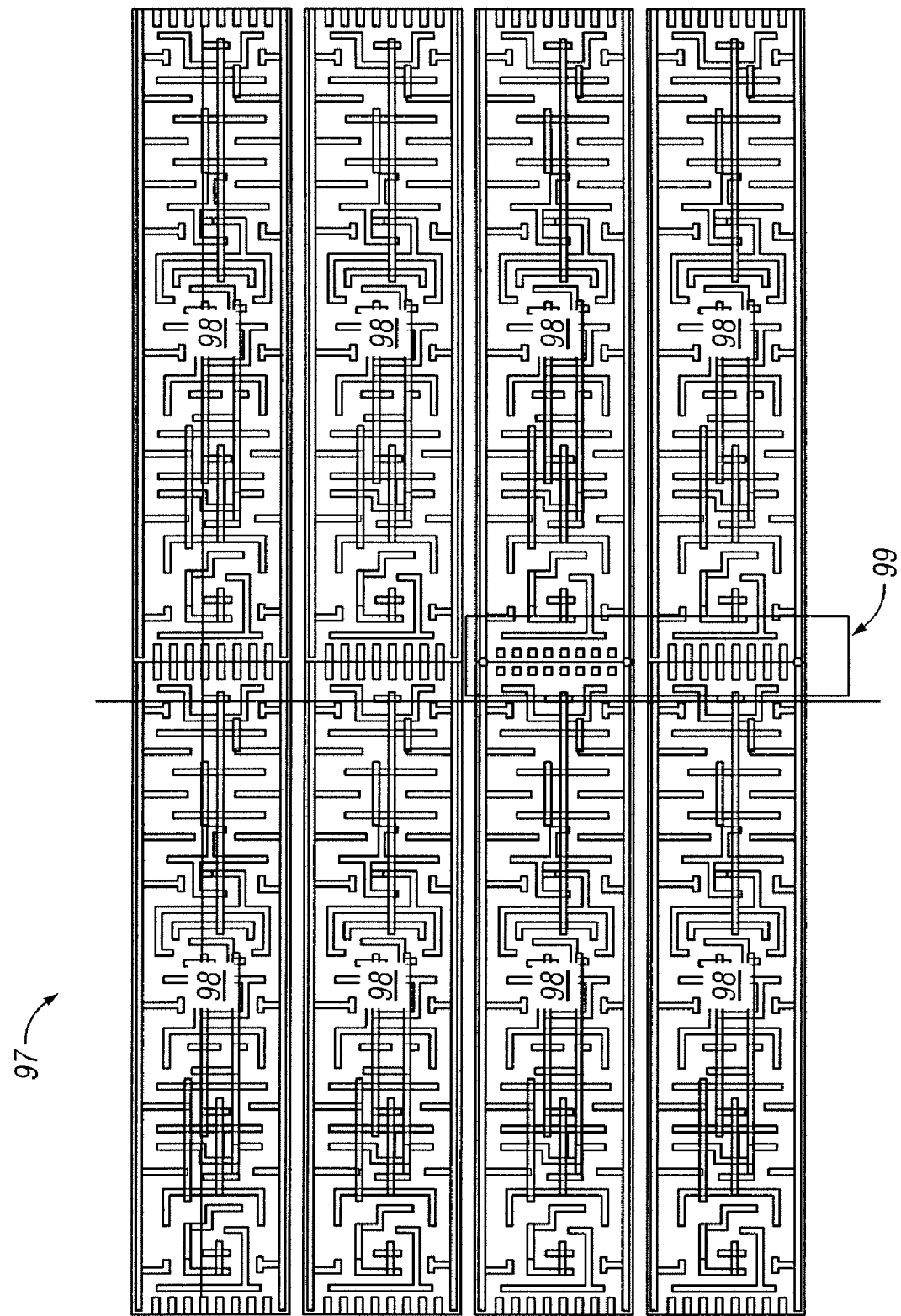
FIG. 11 is a diagram illustrating an example floorplan that has been operated on by a floorplanning method in accordance with one embodiment of the invention.
Figure 12:
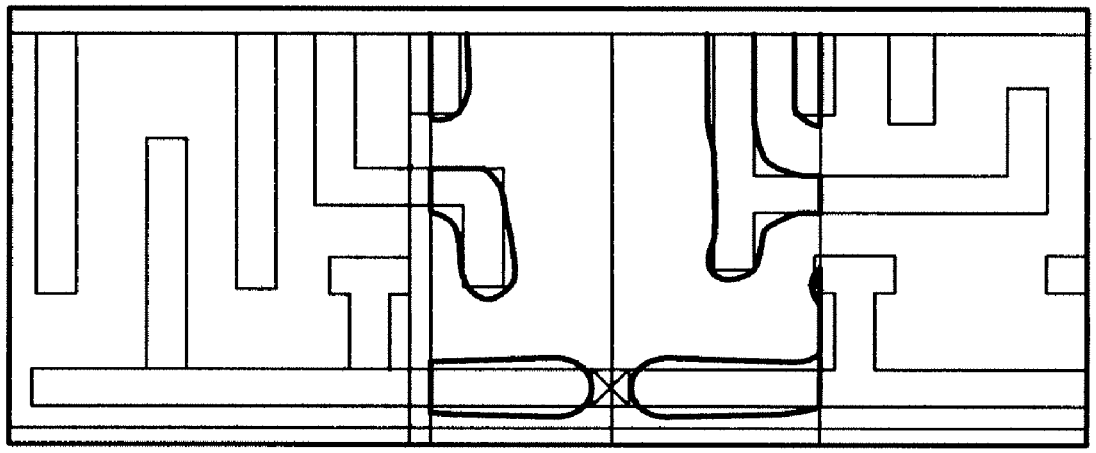
FIG. 12 is a diagram illustrating a close-up view of an example lithography issue discovered by a floorplanning method in accordance with one embodiment of the invention.
Figure 13:
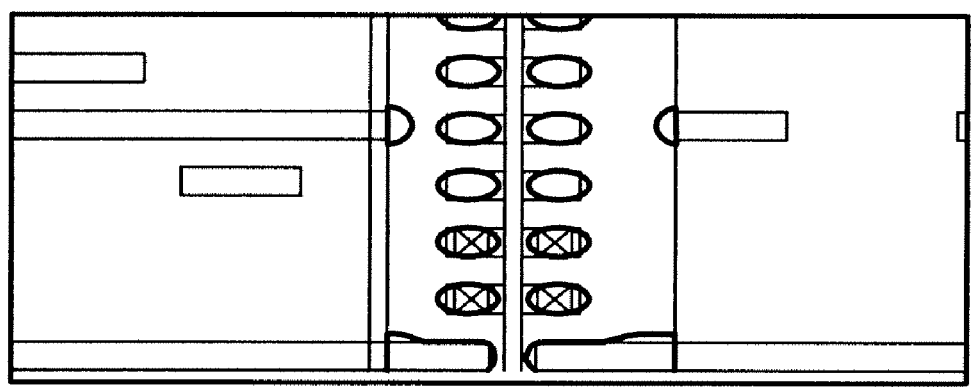
FIG. 13 is a diagram illustrating a close-up view of example lithography issues discovered by a floorplanning method in accordance with one embodiment of the invention.

FIG. 11 provides a floorplan 97, similar to that of floorplan 93, populated with macro-blocks 98, similar to that of macro-block 92. Unlike floorplan 93, the introduction of macro-blocks 98 into floor plan 93 raises lithography issues that would not have been raised otherwise. Accordingly, FIG. 11 illustrates the error markers 99 that would appear in the floorplanner once the floorplan 97 has been lithography analyzed by a method in accordance with one embodiment of the invention. Specifically, FIGS. 12 and 13 provide close-up views of the errors detected by the lithography analysis and designated by error markers 99. FIG. 12 illustrates line-end violations for a circuit pattern M1, while FIG. 13 illustrates line-end violations for a circuit pattern M2. Such violations can result from lithography issues known to exist for line-ends in such close proximity.

The term tool can be used to refer to any apparatus configured to perform a recited function. For example, tools can include a collection of one or more modules and can also be comprised of hardware, software or a combination thereof. Thus, for example, a tool can be a collection of one or more software modules, hardware modules, software/hardware modules or any combination or permutation thereof. As another example, a tool can be a computing device or other appliance on which software runs or in which hardware is implemented.

Figure 14:
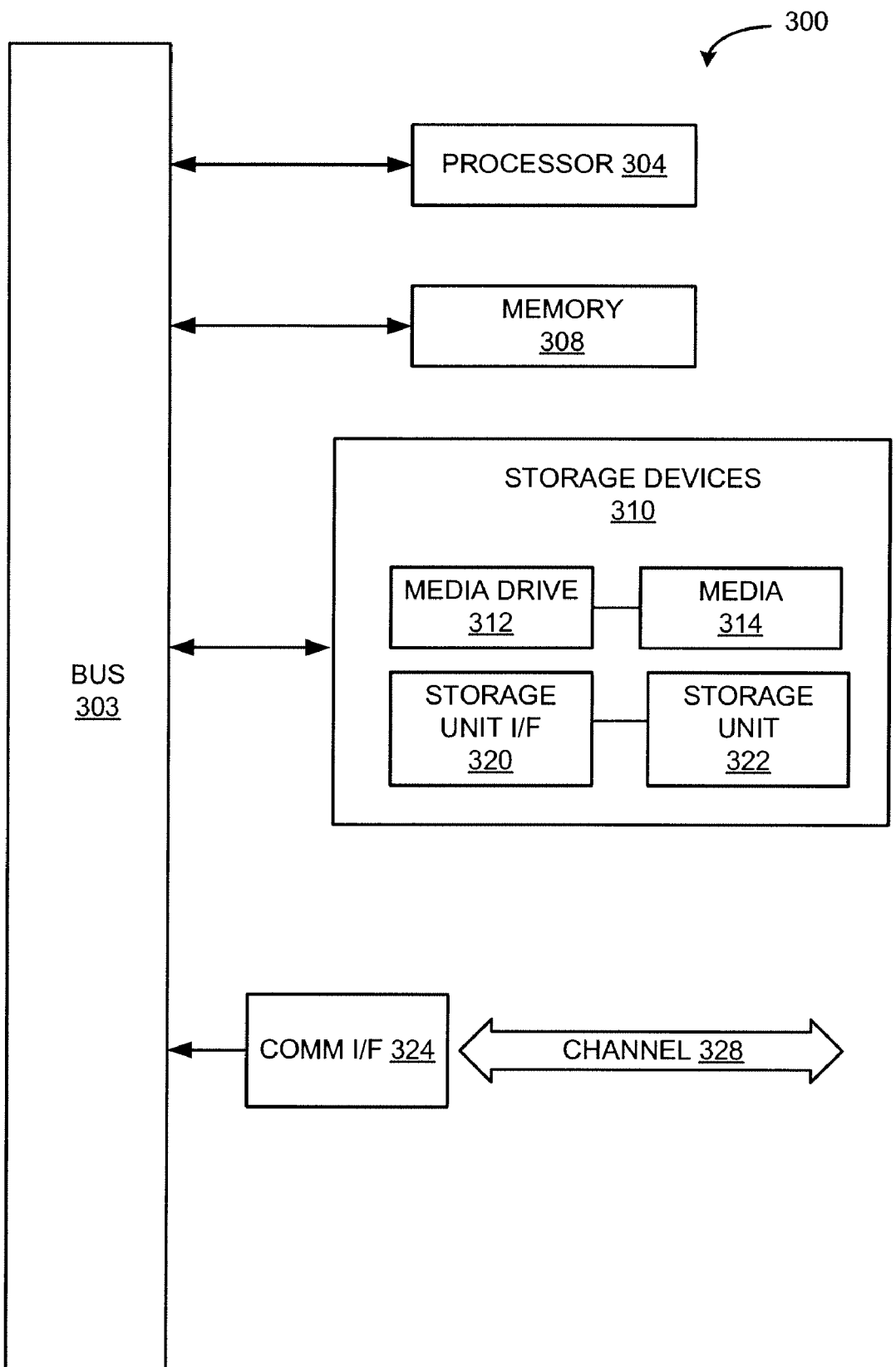
FIG. 14 is a is a diagram illustrating a computer system that can be used in conjunction with some embodiments of the invention.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example-computing module is shown in FIG. 14. Various embodiments are described in terms of this example-computing module 300. After reading this description, it will become apparent to a person skilled in the relevant art how to implement the invention using other computing modules or architectures.

Referring now to FIG. 14, computing module 300 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 300 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 300 might include, for example, one or more processors, controllers, control modules, or other processing devices, such as a processor 304. Processor 304 might be implemented using a general-purpose or special-purpose processing engine such as, for example, a microprocessor, controller, or other control logic. In the example illustrated in FIG. 14, processor 304 is connected to a bus 303, although any communication medium can be used to facilitate interaction with other components of computing module 300 or to communicate externally.

Computing module 300 might also include one or more memory modules, simply referred to herein as main memory 308. For example, preferably random access memory (RAM) or other dynamic memory, might be used for storing information and instructions to be executed by processor 304. Main memory 308 might also be used for storing temporary variables or other intermediate information during execution of instructions to be executed by processor 304. Computing module 300 might likewise include a read only memory ("ROM") or other static storage device coupled to bus 303 for storing static information and instructions for processor 304.

The computing module 300 might also include one or more various forms of information storage mechanism 310, which might include, for example, a media drive 312 and a storage unit interface 320. The media drive 312 might include a drive or other mechanism to support fixed or removable storage media 314. For example, a hard disk drive, a floppy disk drive, a magnetic tape drive, an optical disk drive, a CD or DVD drive (R or RW), or other removable or fixed media drive might be provided. Accordingly, storage media 314, might include, for example, a hard disk, a floppy disk, magnetic tape, cartridge, optical disk, a CD or DVD, or other fixed or removable medium that is read by, written to or accessed by media drive 312. As these examples illustrate, the storage media 314 can include a computer usable storage medium having stored therein computer software or data.

In alternative embodiments, information storage mechanism 310 might include other similar instrumentalities for allowing computer programs or other instructions or data to be loaded into computing module 300. Such instrumentalities might include, for example, a fixed or removable storage unit 322 and an interface 320. Examples of such storage units 322 and interfaces 320 can include a program cartridge and cartridge interface, a removable memory (for example, a flash memory or other removable memory module) and memory slot, a PCMCIA slot and card, and other fixed or removable storage units 322 and interfaces 320 that allow software and data to be transferred from the storage unit 322 to computing module 300.

Computing module 300 might also include a communications interface 324. Communications interface 324 might be used to allow software and data to be transferred between computing module 300 and external devices. Examples of communications interface 324 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 324 might typically be carried on signals, which can be electronic, electromagnetic (which includes optical) or other signals capable of being exchanged by a given communications interface 324. These signals might be provided to communications interface 324 via a channel 328. This channel 328 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 308, storage unit 320, media 314, and signals on channel 328. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 300 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for circuit floorplanning, comprising:
    generating a floorplan through a floorplanner, wherein said generating includes placing macro-blocks;
    performing a lithography-analysis within the floorplanner on a portion of the floorplan, wherein the lithography analysis detects one or more shape-level violations in the interaction of shapes within the floorplan;
    wherein the portion represents a region where the placement of a plurality of macro-blocks results in shapes in sufficiently close proximity to cause errors due to interaction between shapes on adjacent macro-blocks;
    mapping the one or more shape-level violations found within a hierarchy as one or more instance-level violations; and
    using a computing device to generate the one or more instance-level violations.

2. The method of claim 1, wherein generating the floorplan further comprises modifying the floorplan.

3. The method of claim 1, further comprising fixing the violations that result from the lithography-analysis.

4. The method of claim 3, wherein the violations are fixed at an instance-level.

5. The method of claim 3, wherein the violations are fixed at a shape-level.

6. The method of claim 3, wherein fixing the violations is performed manually through the floorplanner.

7. The method of claim 3, wherein fixing the violation is performed through the floorplanner.

8. The method of claim 1, further comprising configuring the lithography-analysis before performing the lithography-analysis on the floorplan.

9. The method of claim 1, wherein performing the lithography-analysis further comprises generating a circuit layout used as input to the lithography-analysis.

10. The method of claim 9, wherein the circuit layout is in GDSII format.

11. The method of claim 9, wherein the circuit layout is compatible with Open Access Database format.

12. The method of claim 1, wherein the one or more instance-level violations are displayed as error markers and hot spots.

13. The method of claim 1, wherein the violations include error markers and hot spots.

14. The method of claim 1, wherein one level of the hierarchy contains at least one instance of a functional block.

15. A computer aided design tool, comprising:
    a processor; and
    a memory, coupled to the processor and having computer program code embodied therein for enabling the processor to perform the operations of:
        generating a floorplan through a floorplanner, wherein said generating includes placing macro-blocks;
        performing a lithography-analysis within the floorplanner on a portion of the floorplan, wherein the lithography analysis detects one or more shape-level violations in the interaction of shapes within the floorplan;

wherein the portion represents a region where the placement of a plurality of macro-blocks results in shapes in sufficiently close proximity to cause errors due to interaction between shapes on adjacent macro-blocks;

mapping the one or more shape-level violations found within a hierarchy as one or more instance-level violations; and generating the one or more instance-level violations.

16. The computer aided design tool of claim 15, wherein generating the floorplan further comprises modifying the floorplan.

17. The computer aided design tool of claim 15, further comprising fixing the violations that result from the lithography-analysis.

18. The computer aided design tool of claim 17, wherein the violations are fixed at an instance-level.

19. The computer aided design tool of claim 17, wherein the violations are fixed at a shape-level.

20. The computer aided design tool of claim 17, wherein fixing the violations is performed manually through the floorplanner.

21. The computer aided tool of claim 17, wherein fixing the violation is performed through the floorplanner.

22. The computer aided design tool of claim 15, further comprising configuring the lithography-analysis before performing the lithography-analysis on the floorplan.

23. The computer aided design tool of claim 15, wherein performing the lithography-analysis further comprises generating a circuit layout used as input to the lithography-analysis.

24. The computer aided design tool of claim 23, wherein the circuit layout is in GDSII format.

25. The computer aided design tool of claim 23, wherein the circuit layout is compatible with Open Access Database format.

26. The computer aided design tool of claim 15, wherein generating the one or more instance-level violations comprises overlaying the instance-level violations over the floorplan.

27. The computer aided design tool of claim 15, wherein the one or more instance-level violations are displayed as error markers and hot spots.

28. The computer aided design tool of claim 15, wherein one level of the hierarchy contains at least one instance of a functional block.

29. A computer program comprising a non-transitory computer useable medium having computer program code embodied therein for enabling a computing device to perform the operations of:

generating a floorplan through a floorplanner, wherein said generating includes placing macro-blocks;

performing a lithography-analysis within the floorplanner on a portion of the floorplan, wherein the lithography analysis detects one or more shape-level violations in the interaction of shapes within the floorplan;

wherein the portion represents a region where the placement of a plurality of macro-blocks results in shapes in sufficiently close proximity to cause errors due to interaction between shapes on adjacent macro-blocks;

mapping the one or more shape-level violations found within a hierarchy as one or more instance-level violations; and generating the one or more instance-level violations.

30. The computer program product of claim 29, wherein generating the floorplan further comprises modifying the floorplan.

31. The computer program product of claim 29, further comprising fixing the violations that result from the lithography-analysis.

32. The computer program product of claim 31, wherein the violations are fixed at an instance-level.

33. The computer program product of claim 31, wherein the violations are fixed at a shape-level.

34. The computer program product of claim 31, wherein fixing the violations is performed manually through the floorplanner.

35. The computer program product of claim 31, wherein fixing the violation is performed through the floorplanner.

36. The computer program product of claim 29, further comprising configuring the lithography-analysis before performing the lithography-analysis on the floorplan.

37. The computer program product of claim 29, wherein performing the lithography-analysis further comprises generating a circuit layout used as input to the lithography-analysis.

38. The computer program product of claim 37, wherein the circuit layout is in GDSII format.

39. The computer program product of claim 37, wherein the circuit layout is compatible with Open Access Database format.

40. The computer program product of claim 29, wherein generating the one or more instance-level violations comprises overlaying the instance-level violations over the floorplan.

41. The computer program product of claim 29, wherein the one or more instance-level violations are displayed as error markers and hot spots.

42. The computer program product of claim 29, wherein one level of the hierarchy contains at least one instance of a functional block.

* * * * *